United States Patent
Lee et al.

(10) Patent No.: US 10,536,662 B2
(45) Date of Patent: Jan. 14, 2020

(54) METHOD FOR ZAPPING CONTENTS AND DISPLAY APPARATUS FOR IMPLEMENTING THE SAME

(75) Inventors: Hyeon-ji Lee, Seoul (KR); Yong-hwan Kwon, Seongnam-si (KR); Jun-mo Ahn, Seoul (KR); Hee-jeong Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/223,927

(22) Filed: Sep. 1, 2011

(65) Prior Publication Data

US 2012/0060190 A1   Mar. 8, 2012

(30) Foreign Application Priority Data

Sep. 3, 2010   (KR) .................. 10-2010-0086549

(51) Int. Cl.

| H04N 5/445 | (2011.01) |
|---|---|
| H04N 21/482 | (2011.01) |
| H04N 21/442 | (2011.01) |
| H04N 21/45 | (2011.01) |
| H04N 21/475 | (2011.01) |
| H04N 21/266 | (2011.01) |
| H04N 5/44 | (2011.01) |

(52) U.S. Cl.
CPC ... *H04N 5/44543* (2013.01); *H04N 21/44222* (2013.01); *H04N 21/4532* (2013.01); *H04N 21/4755* (2013.01); *H04N 21/482* (2013.01); *H04N 21/266* (2013.01); *H04N 2005/441* (2013.01); *H04N 2005/4412* (2013.01)

(58) Field of Classification Search
CPC ..................... H04N 2005/441; H04N 21/266
USPC ..................... 725/46, 38, 44, 39, 43, 45, 48
See application file for complete search history.

(56) References Cited

U.S. PATENT DOCUMENTS

| 5,495,295 A | 2/1996 | Long |
| 5,835,717 A * | 11/1998 | Karlton .............. H04N 7/17318 |
| | | 348/E7.071 |
| 7,096,489 B2 | 8/2006 | Kitsukawa et al. |
| 8,205,228 B2 * | 6/2012 | Han et al. ........................ 725/38 |

(Continued)

FOREIGN PATENT DOCUMENTS

| CN | 101335855 A | 12/2008 |
| EP | 0550911 A1 | 7/1993 |

(Continued)

OTHER PUBLICATIONS

Communication, dated Nov. 28, 2011, issued by the European Patent Office in corresponding European Application No. 11165360.6.

(Continued)

*Primary Examiner* — Pankaj Kumar
*Assistant Examiner* — Sahar Aqil Riaz
(74) *Attorney, Agent, or Firm* — Sughrue Mion, PLLC

(57) ABSTRACT

A content zapping method for accessing multimedia contents rapidly and easily by accessing the multimedia contents on a browser basis, includes receiving a screen change command for at least one broadcast channel or at least one content; and changing a screen to a browser which provides the at least one broadcast channel or the at least one content corresponding to the received screen change command, in an order of a pre-stored list.

26 Claims, 8 Drawing Sheets

(56) References Cited

U.S. PATENT DOCUMENTS

| | | | |
|---|---|---|---|
| 2002/0083448 A1* | 6/2002 | Johnson | H04N 5/44543 725/39 |
| 2002/0124071 A1 | 9/2002 | Proehl et al. | |
| 2005/0094031 A1* | 5/2005 | Tecot | G11B 27/105 348/473 |
| 2005/0204384 A1* | 9/2005 | Yuen | H04N 5/44543 725/43 |
| 2006/0085828 A1* | 4/2006 | Dureau et al. | 725/100 |
| 2007/0204297 A1* | 8/2007 | Gonzalez | 725/41 |
| 2008/0046937 A1* | 2/2008 | Smith et al. | 725/89 |
| 2009/0154898 A1* | 6/2009 | Barrett | G11B 27/105 386/241 |
| 2009/0204929 A1* | 8/2009 | Baurmann | H04N 5/44543 715/836 |
| 2009/0222757 A1* | 9/2009 | Gupta | H04N 5/44543 715/776 |
| 2009/0228926 A1* | 9/2009 | Van De Sluis | H04N 5/44543 725/39 |
| 2010/0083304 A1* | 4/2010 | Pan | H04N 5/4403 725/34 |
| 2013/0152126 A1* | 6/2013 | Shkedi | 725/34 |

FOREIGN PATENT DOCUMENTS

| | | | | |
|---|---|---|---|---|
| EP | 1528566 A2 * | 5/2005 | | G11B 27/105 |
| EP | 1646229 A2 | 4/2006 | | |
| JP | 2009-43309 A | 2/2009 | | |
| KR | 10-2009-0075212 A | 7/2009 | | |

OTHER PUBLICATIONS

Communication dated Mar. 22, 2016 issued by the European Patent Office in counterpart European Patent Application No. 11165360.6.
Communication dated Jul. 19, 2016, issued by the Korean Intellectual Property Office in corresponding Korean Application No. 10-2010-0086549.
Communication dated Mar. 16, 2017, issued by the Korean Intellectual Property Office in corresponding Korean Application No. 10-2010-0086549.
Communication dated Mar. 1, 2018 by the European patent office in counterpart European Patent Application No. 11165360.6.
Communication dated Oct. 12, 2018, from the European Patent Office in counterpart European Application No. 11165360.6.

* cited by examiner

METHOD FOR ZAPPING CONTENTS AND DISPLAY APPARATUS FOR IMPLEMENTING THE SAME

CROSS-REFERENCE TO RELATED APPLICATIONS

This application claims priority from Korean Patent Application No. 10-2010-0086549, filed Sep. 3, 2010, in the Korean Intellectual Property Office, the disclosure of which is incorporated herein by reference in its entirety.

BACKGROUND

1. Field

Apparatuses and methods consistent with the exemplary embodiments relate to content zapping and a display for the content zapping, and more particularly to a method for zapping, not only broadcast channels, but also multimedia contents and a display apparatus for implementing the method.

2. Description of the Related Art

The present disclosure relates to a User Interface (UI) for zapping broadcast channels and multimedia contents in a screen of a display apparatus rapidly and easily.

To change a television (TV) channel in the screen, a related art method needs to use a channel button as shown in FIG. 1. A source button needs to be used to change the screen to an external source content, and a menu button is used to change the screen to a multimedia content. As such, it is inconvenient to use the different remote controller buttons.

For example, when a user watching the TV channel wants to change to a recently viewed video, he/she needs to follow "menu→video→file selection". To change to the screen for playing music, the user needs to follow "menu→music→file selection". To change to the screen for reproducing a picture, the user needs to follow "menu→photo→file selection".

That is, when the user who is watching the broadcast channel wants to change to the screen for reproducing the multimedia contents such as video, music, and photo, he/she needs to go through several steps as discussed above.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

An aspect of the exemplary embodiments provides a method for zapping multimedia contents on a browser basis through a single manipulation, and a display apparatus for implementing the method.

According to an aspect of the exemplary embodiments, a content zapping method includes receiving a screen change command for at least one broadcast channel or at least one content; and changing a screen to a browser which provides the at least one broadcast channel or the at least one content corresponding to the received screen change command, in an order of a pre-stored list.

The content zapping method may further include when the screen change command is information relating to a recently viewed list, displaying the recently viewed list which includes at least one of a recently viewed broadcast channel, a recently viewed content stored in the display apparatus, and a recently viewed external source content.

The recently viewed list may be displayed in a thumbnail form.

The recently viewed list may include information relating to a recently played end time of at least one of the broadcast channel, the content stored inside, and the external source content.

The browser may include at least one of a video browser, a music browser, and a photo browser.

The at least one content may be provided together with contents of the same type as the at least one content through the browser corresponding to the at least one content type.

The browser may provide the at least one content in a thumbnail form.

The screen change command may be input through a channel button or a touch input device.

The pre-stored list may include at least one of the broadcast channel, the content stored inside, and the external source content.

The pre-stored list may be a preference list mainly viewed by a user.

According to another aspect of the exemplary embodiments, there is provided a display apparatus which includes a screen command change input unit for receiving a screen change command for at least one broadcast channel or at least one content; a screen output unit for displaying a broadcast channel or a content corresponding to the screen change command; and a controller for controlling the screen output unit to change a screen to a browser which provides the at least one broadcast channel or the at least one content corresponding to the received screen change command, in an order of a pre-stored list.

According to another aspect of the exemplary embodiments, when the screen change command is information relating to a recently viewed list, the controller may control the screen output unit to display the recently viewed list which includes at least one of a recently viewed broadcast channel, a recently viewed content stored inside, and a recently viewed external source content.

The recently viewed list may be displayed in a thumbnail form.

The recently viewed list may include information relating to a recently played end time of at least one of the broadcast channel, the content stored inside, and the external source content.

The browser may include at least one of a video browser, a music browser, and a photo browser.

The at least one content may be provided together with contents of the same type as the at least one content through the browser corresponding to the at least one content type.

The browser may provide the at least one content in a thumbnail form.

The screen change command may be input through a channel button or a touch input device.

The pre-stored list may include at least one of the broadcast channel, the content stored inside, and the external source content.

The pre-stored list may be a preference list mainly viewed by a user.

BRIEF DESCRIPTION OF THE DRAWINGS

The above and/or other aspects will become more apparent by describing certain exemplary embodiments with reference to the accompanying drawings, in which.

DETAILED DESCRIPTION OF THE EXEMPLARY EMBODIMENTS

Figure 1:
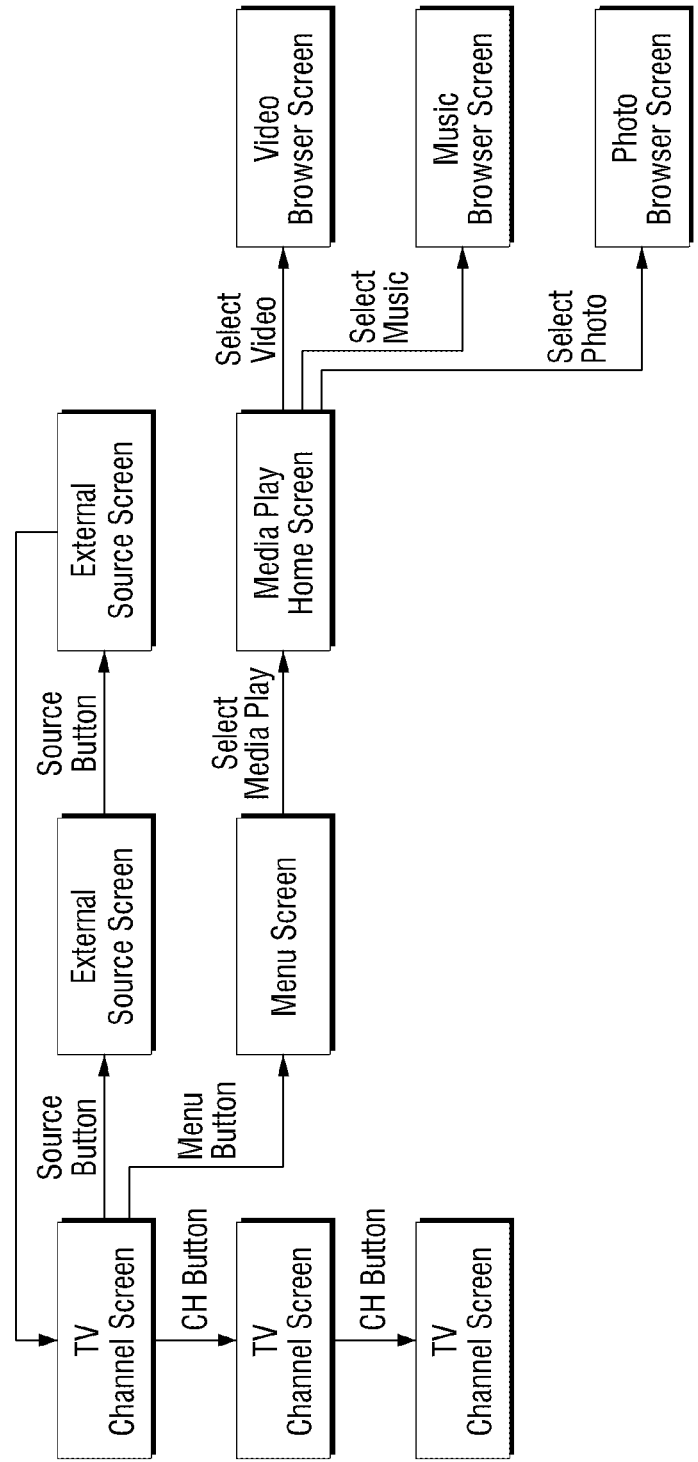
FIG. 1 is a diagram of a related art content zapping method.

Exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of the exemplary embodiments. However, the exemplary embodiments can be practiced without those specifically defined matters. Also, well-known functions or constructions are not described in detail since they would obscure the exemplary embodiments with unnecessary detail.

Figure 2:
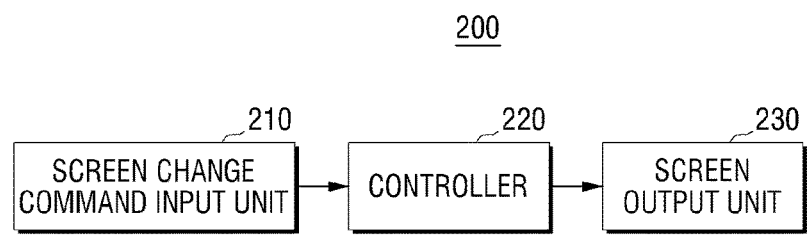
FIG. 2 is a simplified block diagram of a display apparatus according to an exemplary embodiment.

FIG. 2 is a simplified block diagram of a display apparatus according to an exemplary embodiment. As shown in FIG. 2, the display apparatus 200 includes a screen change command input unit 210, a controller 220, and a screen output unit 230.

The screen change command input unit 210 includes a selection key (not shown) required to input a screen change command with respect to at least one broadcast channel or at least one content, and a selection key (not shown) required to turn on/off the display apparatus and to set a configuration. Through the selection key, the screen change command is input.

Using the selection key of the screen change command input unit 210, a user can input the screen change command to switch to his/her intended broadcast channel or content.

For example, the screen change command input unit 210 can include various selection keys such as channel up/down buttons, volume up/down buttons, and channel number input buttons.

The screen change command input unit 210 can be disposed outside the display apparatus 200, or may be a remote controller. When the screen change command input unit 210 is the remote controller, the display apparatus 200 can receive the screen change command to switch the screen to the broadcast channel or the content through a sensor (not shown).

The controller 220 controls the screen output unit 230 to change to a browser which provides at least one broadcast channel or at least one content corresponding to the screen change command input via the screen change command input unit 210, in the order of a pre-stored list.

That is, according to the screen change command for switching the screen, the controller 220 controls the screen output unit 230 to change the screen to the corresponding broadcast channel and to display the browser providing the corresponding multimedia content.

Herein, the at least one content can be multimedia content stored in the display apparatus 200 or multimedia content stored in an external source device connected with the display apparatus 200 by wired or wireless means.

When the screen change command is information relating to a recently viewed list, the controller 220 can control the screen output unit 230 to display the recently viewed list including at least one of recently viewed broadcast channels, recently viewed contents stored in the display apparatus, and recently viewed external source contents.

That is, when the user inputs the screen change command to display the recently viewed list, the controller 220 controls the screen output unit 230 to display in the screen the list of the recently viewed broadcast channels or the recently viewed multimedia contents.

The recently viewed list can be displayed on an On-Screen Display (OSD) of the screen in the form of thumbnails.

Hence, the display apparatus provides not only the broadcast channels but also various contents as the thumbnails in the recently viewed list so that the user can check the corresponding broadcast channel or multimedia content in real time without zapping the channels. In addition, the user can select the recently viewed channels, the multimedia contents, and the external source content displayed in the recently viewed list and immediately change to his/her intended screen.

The recently viewed list can include information of a recently played end time of at least one of the broadcast channel, the content stored therein, and the external source content.

Since the user can acquire the information of the recently played end time of the contents displayed in the recently viewed list, the display apparatus can reproduce the selected content from the recent play end time, rather than from the very start.

The pre-stored list can be a preference list of the user and include at least one of the broadcast channel, the content stored in the display apparatus, and the external source content.

The user can register his/her preferred content list to the preference list. The preference list can enumerate not only the broadcast channels but also the contents stored therein and the external source contents, such as video contents, music contents, and photo contents. The contents in the preference list can be stored in the order as registered by the user. When the user inputs the screen change command, the screen can be zapped to the corresponding contents in the order of the user's registration.

The screen change command can be input via the channel buttons or a touch input device, but is not limited thereto.

For example, using the channel up/down buttons or the touch input device such as touch screen of the remote controller or a touch pad, the user can switch the screen to the broadcast channel, the video content, the music content, and the external source content stored in the preference list stored to the pre-stored list.

By means of the channel buttons or the touch input device, the display apparatus can easily access the browser which reproduces the channels, the external source contents and the contents stored therein such as multimedia contents.

The browser can include at least one of a video browser, a music browser, and a photo browser.

For example, the display apparatus can zap the screens on the browser basis per content type, such as video browser, music browser, and photo browser, rather than directly switching to the content selected by the user among the contents of the pre-stored list. Since the display apparatus does not access the contents on the file basis, there is no need to allocate many channels and the user can access the multimedia contents rapidly and easily.

The at least one content can be provided together with contents of the same content type through the browser corresponding to the at least one content type. The browser can provide the at least one content as the thumbnail.

That is, the browser combines the multimedia contents serviceable by the corresponding browser as the thumbnails according to the multimedia content type selected by the user and then provides the contents to the user.

The browser used in the display apparatus is not limited to the video browser, the music browser, and the photo browser as stated above, and can employ content type based browsers capable of providing and reproducing various contents, for example, YouTube content browser or DMB content browser.

Figure 3:
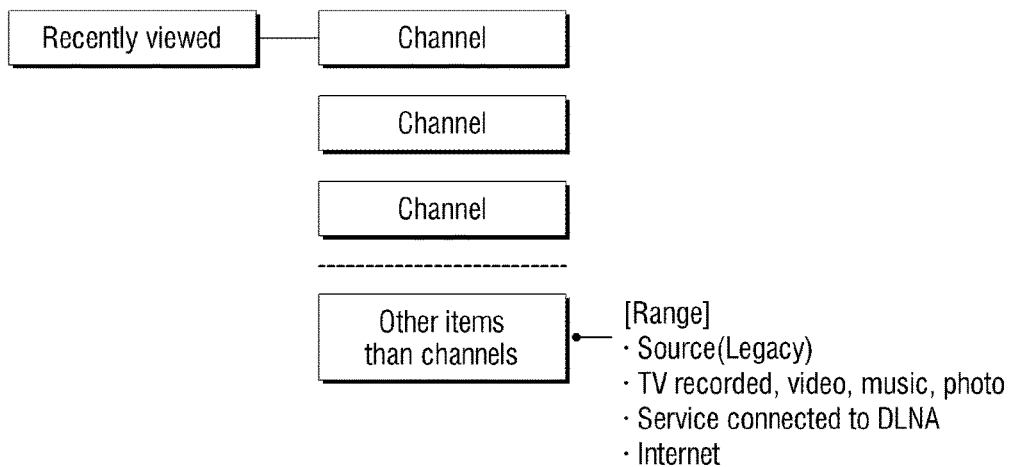
FIGS. 3, 4 and 5 are diagrams a recently viewed list provided by the display apparatus according to an exemplary embodiment.
Figure 4:
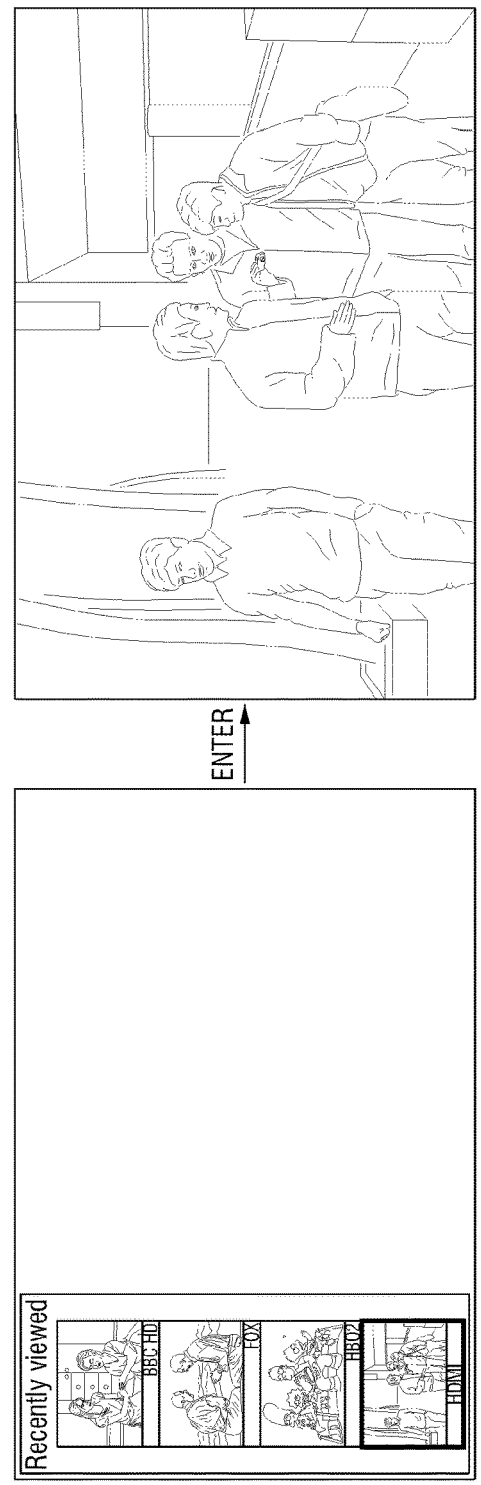
Figure 5:
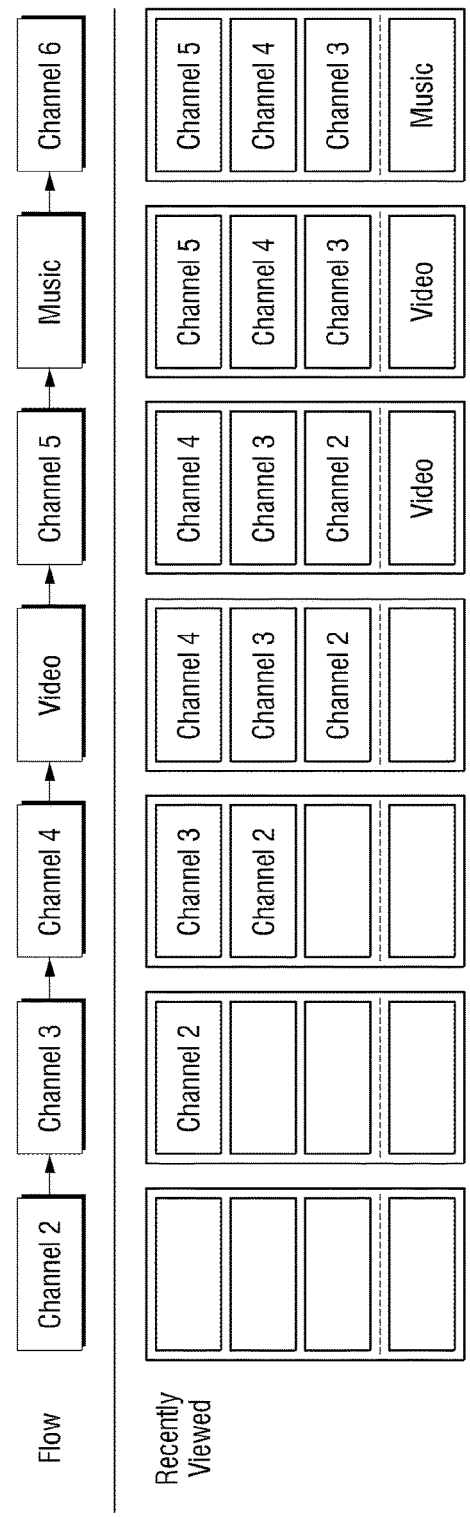

Now, the recently viewed list provided by the display apparatus is explained by referring to FIGS. 3, 4 and 5.

The recently viewed list "Recently Viewed" can include various contents, for example, at least one broadcast channel recently viewed, legacy, external source contents such as Universal Serial Bus (USB), and IEEE 1394 interface, contents stored to the display apparatus such as recorded TV program, video, music, and photo, service connected to Digital Living Network Alliance (DLNA), and Internet as shown in FIG. 3.

Herein, the legacy interface indicates a relative previous or former interface as high-function and high-efficiency interfaces emerge. As the latest interfaces such as Universal Serial Bus (USB) and IEEE 1394 are replacing the former interfaces such as ISA and PS/2, the former interface is referred to as the legacy interface.

The recently viewed list "Recently Viewed" can be displayed as the On-Screen Display (OSD) in the screen as shown in FIG. 4. When the user selects the content corresponding to the High-Definition Multimedia Interface (HDMI) external source content as shown in FIG. 4, the selected content is reproduced.

The recently viewed list "Recently Viewed" can be stored in the order of the history selected by the user and reproduced at the display apparatus as shown in FIG. 5.

In more detail, the recently viewed list can be stored to a queue (not shown) of the display apparatus 200. The type and the number of the contents stored to the recently viewed list are not limited to those in FIG. 5, and can be variously set.

Hence, the contents besides the broadcast channel do not include merely one multimedia content, but the plurality of the multimedia contents can be stored to the recently viewed list as shown in FIG. 5.

Figure 6:
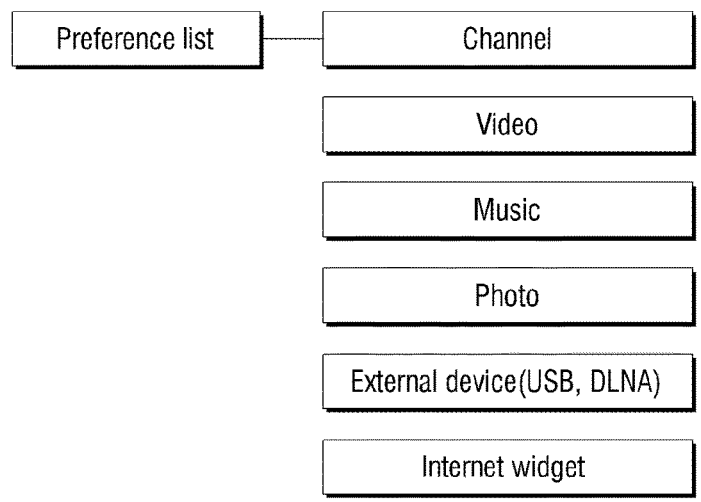
FIGS. 6 and 7 are diagrams of a method for changing a screen to contents stored in a preference list provided by the display apparatus according to an exemplary embodiment.
Figure 7:
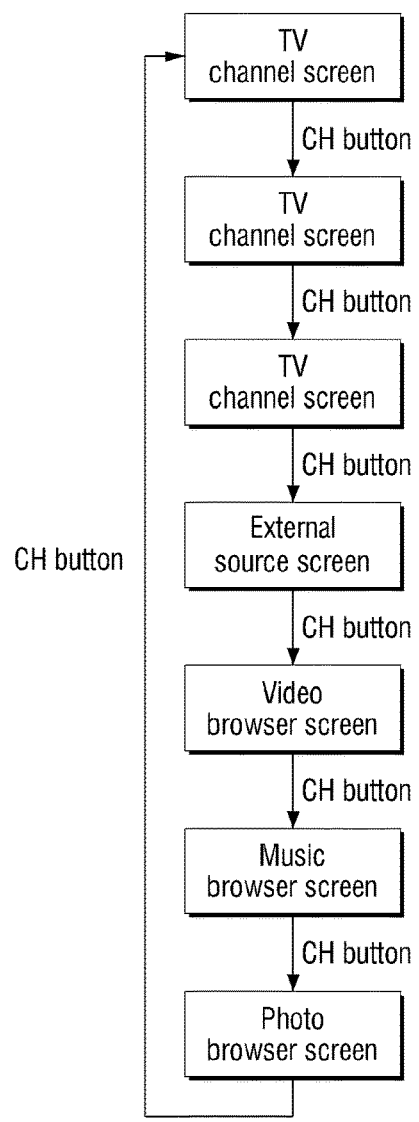

Hereafter, a method for changing the screen to the contents stored to the preference list provided by the display apparatus is described by referring to FIGS. 6 and 7.

The preference list registered by the user can include the various multimedia contents such as broadcast channels, contents stored in the display device including video, music, and photo, and external source contents from external devices (USB and DLAN) and Internet widget as shown in FIG. 6.

When the preference list includes, for example, three TV channel screens, the external source screen, the video browser screen, the music browser screen, and the photo browser screen in order as shown in FIG. 7, the user can zap the broadcast channels, the external source contents, and the contents stored therein registered to the preference list, using the channel buttons. Herein, while the display apparatus uses the channel buttons to zap the contents in FIG. 7, the screen can be changed using the touch input device of the remote controller, besides the channel buttons.

The display apparatus accesses the multimedia contents stored in the display device, such as video contents, music contents, and photo contents, through the browser of the corresponding content, rather than the corresponding content file, and thus rapidly accesses the multimedia contents without having to allocate the channels.

Referring back to FIG. 1, the screen output unit 230 displays the broadcast channel or the content corresponding to the screen change command input via the screen change command input unit 210.

That is, the screen output unit 230 switches the screen to the browser providing the broadcast channel or the content displayed in the screen output unit 230 under the control of the controller 220.

Herein, the display apparatus can be a display device including a display unit, such as a TV, and may employ a display device, such as a DVD player, which supplies a video signal to the display unit installed externally.

Figure 8:
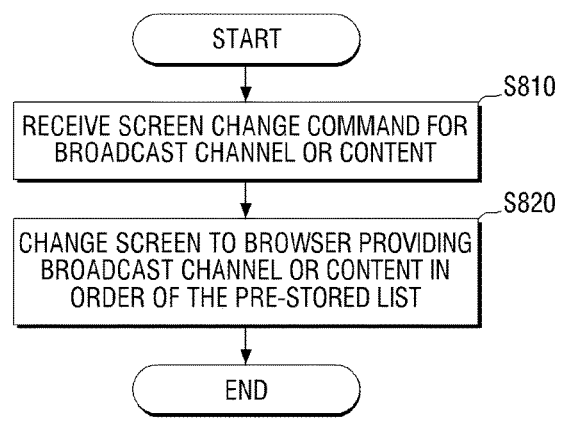
FIG. 8 is a flowchart of a displaying method according to an exemplary embodiment.

FIG. 8 is a flowchart of a displaying method according to an exemplary embodiment.

First, the method receives the screen change command for at least one broadcast channel or at least one content (operation S810).

Herein, the screen change command can be input through the screen change command input unit disposed outside of the display apparatus, or the sensor disposed outside of the display apparatus.

The screen change command input unit includes the selection key required to input the screen change command with respect to at least one broadcast channel or at least one content, and the selection key required to turn on/off the display apparatus and to set the configuration. Through the selection key, the screen change command is input.

Using the selection key of the screen change command input unit, the user can input the screen change command to switch to his/her intended broadcast channel or content.

For example, the screen change command input unit can include various selection keys such as channel up/down buttons, volume up/down buttons, and channel number input buttons, or the touch input device such as a touch pad or a touch screen.

When the screen change command is the information relating to the recently viewed list, the content zapping method can display the recently viewed list including at least one of the recently viewed broadcast channels, the recently viewed contents stored in the display apparatus, and the recently viewed external source contents.

That is, when receiving the screen change command to display the recently viewed list, the content zapping method can display in the screen the list of the broadcast channels or the multimedia contents recently viewed by the user.

Herein, the recently viewed list can be displayed on the OSD of the screen in the form of thumbnails.

Hence, the content zapping method provides not only the broadcast channels but also various contents as the thumbnails in the recently viewed list so that the user can check the corresponding broadcast channel or multimedia content in real time without zapping the channels. In addition, the user can select the recently viewed channels, the recently viewed multimedia contents, and the recently viewed external source content displayed in the recently viewed list and immediately change to his/her intended screen.

The recently viewed list can include the information of the play end time of at least one of the broadcast channel, the content stored therein, and the external source content.

Since the user can acquire the information of the play end time of the contents displayed in the recently viewed list, the content zapping method can reproduce the selected content from the recent play end time, rather than from the very start.

Next, the method changes the screen to the browser which provides at least one broadcast channel or at least one content corresponding to the received screen change command in the order of the pre-stored list (operation S820).

That is, according to the screen change command for switching the screen, the content zapping method can change the screen not only to the corresponding broadcast channel but also to the browser providing the corresponding multimedia content.

Herein, the at least one content can be the multimedia content stored in the display apparatus which carries out the content zapping method, or the multimedia content stored in the external source device connected with the display apparatus by wired or wireless means.

The pre-stored list can be the preference list of the user, and include at least one of the broadcast channel, the content stored therein, and the external source content.

The user can register his/her preferred content list to the preference list. The preference list can enumerate not only the broadcast channels but also the contents stored therein and the external source contents, such as video contents, music contents, and photo contents. The contents in the preference list can be stored in the order as registered by the user. When the user inputs the screen change command, the screen can be changed to the corresponding contents in the order of the user's registration.

The screen change command can be input via the channel buttons or the touch input device.

For example, using the channel up/down buttons, the user can switch the screen to the broadcast channel, the video content, the music content, and the external source content stored in the preference list stored to the pre-stored list.

By means of the channel buttons or the touch input device, the content zapping method can easily access the browser which reproduces the channels, the external source contents, and the contents stored therein such as multimedia contents.

The browser can include at least one of the video browser, the music browser, and the photo browser.

The content zapping method changes the screen on the browser basis, such as video browser, music browser, and photo browser, per content type, rather than directly switching to the content selected by the user among the contents of the pre-stored list. As such, since the method does not access the contents on the file basis, there is no need to allocate many channels and the user can access the multimedia contents rapidly and easily.

The at least one content can be provided together with the contents of the same content type through the browser corresponding to the at least one content type. The browser can provide the at least one content as the thumbnail.

That is, the browser combines the multimedia contents serviceable by the corresponding browser as the thumbnails according to the multimedia content type selected by the user and then provides the contents to the user.

Herein, the content zapping method can be embodied in a computer-readable recording medium which is realized with program commands executable through various computer means. The computer-readable recording medium can contain program commands, data files, and data structures alone or in combination. Meanwhile, the program commands embodied in the recording medium can be specifically designed or constructed for the exemplary embodiments, or well-known to those skilled in computer software.

The computer-readable recording medium includes magnetic media such as hard disk, floppy disk, and magnetic tape, optical recording media such as CD and DVD, magneto-optical media such as floppy disk, and hardware devices containing and executing program commands, such as ROM, RAM, and flash memory.

The invention may also be embodied in other exemplary embodiments where the recording medium can be a transmission medium, such as optical or metallic line and waveguide, including carriers which deliver signals to define program commands and data structure.

The program commands include machine language codes created by a compiler and high-level language codes executable by the computer using an interpreter. The hardware device can function as one or more software modules for the exemplary embodiments, and vice versa.

In the light of the foregoing, it is possible to access the multimedia contents rapidly and easily by accessing the multimedia contents on the browser basis.

The foregoing exemplary embodiments are merely exemplary and are not to be construed as limiting the inventive concept. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A content displaying method of a display apparatus, the method comprising:
   displaying, by the display apparatus, a broadcast content;
   receiving, by the display apparatus while the broadcast content is being displayed, a user input for changing a screen of the display apparatus; and
   displaying, by the display apparatus in response to the user input, a multimedia content based on a pre-stored list, the pre-stored list comprising information on a first predetermined number of broadcast contents including the broadcast content and information on a second predetermined number of multimedia contents including the multimedia content;
   wherein based on a user input for adding a new broadcast content to the pre-stored list, updating the pre-stored list by adding information on the new broadcast content to the pre-stored list and deleting information on one of the broadcast contents included in the pre-stored list,
   wherein based on a user input for adding a new multimedia content to the pre-stored list, updating the pre-stored list by adding information on the new multimedia content to the pre-stored list and deleting information on one of the multimedia contents included in the pre-stored list,
   wherein the updated pre-stored list comprises information on the first predetermined number of broadcast contents and information on the second predetermined number of multimedia contents, and
   wherein the user input is input through a button or a touch input device.

2. The content displaying method of claim 1, wherein the multimedia contents comprises at least one of a stored multimedia content stored in the display apparatus and a recently displayed external source content.

3. The content displaying method of claim 2, wherein the pre-stored list is displayed in a thumbnail form.

4. The content displaying method of claim 1, wherein:
the broadcast contents or the multimedia contents are provided, in the order of the pre-stored list, via a browser; and
the browser comprises at least one of a video browser, a music browser, and a photo browser.

5. The content displaying method of claim 1, wherein the multimedia content is provided together with contents of a same type as the multimedia content through a browser corresponding to at least one content type.

6. The content displaying method of claim 1, wherein the multimedia contents are provided in a thumbnail form.

7. The content displaying method of claim 2, wherein the pre-stored list comprises the information on the first predetermined number of broadcast contents corresponding to recently displayed broadcast contents.

8. The content displaying method of claim 1, wherein the pre-stored list is a preference list mainly viewed by a user.

9. A display apparatus comprising:
a input device;
a screen output unit; and
a controller configured to:
control the screen output unit to display a broadcast content,
receive, while the broadcast content is being displayed, a user input for changing a screen of the display apparatus through the input device,
control, in response to the user input being received, the screen output unit to display a multimedia content based on a pre-stored list, the pre-stored list comprising information on a first predetermined number of broadcast contents including the broadcast content and information on a second predetermined number of the multimedia contents,
wherein the controller is further configured to:
based on a user input for adding a new broadcast content to the pre-stored list being received through the input device, update the pre-stored list by adding information on the new broadcast content to the pre-stored list and deleting information on one of the broadcast contents included in the pre-stored list,
wherein based on a user input for adding a new multimedia content to the pre-stored list being received through the input device, update the pre-stored list by adding information on the new multimedia content to the pre-stored list and deleting information on one of the multimedia contents included in the pre-stored list,
wherein the updated pre-stored list comprises information on the first predetermined number of broadcast contents and information on the second predetermined number of multimedia contents.

10. The display apparatus of claim 9, wherein the multimedia contents comprises at least one of a stored multimedia content stored in the display apparatus and a recently displayed external source content.

11. The display apparatus of claim 10, wherein the pre-stored list is displayed in a thumbnail form.

12. The display apparatus of claim 9, wherein:
the broadcast contents or the multimedia contents are provided, in the order of the pre-stored list, via a browser; and
the browser comprises at least one of a video browser, a music browser, and a photo browser.

13. The display apparatus of claim 9, wherein the multimedia content is provided together with contents of a same type as the multimedia content through a browser corresponding to the at least one content type.

14. The display apparatus of claim 9, wherein the multimedia contents are provided in a thumbnail form.

15. The display apparatus of claim 10, wherein the pre-stored list comprises the information on the first predetermined number of broadcast contents corresponding to recently displayed broadcast contents.

16. The display apparatus of claim 9, wherein the pre-stored list is a preference list mainly viewed by a user.

17. The content displaying method of claim 2, wherein the pre-stored list comprises information relating to a recent play end time of at least one of recently displayed broadcast content, the stored multimedia content stored in the display apparatus, and the recently displayed external source content.

18. The display apparatus of claim 10, wherein the pre-stored list comprises information relating to a recent play end time of at least one of the recently displayed broadcast content, the stored multimedia content stored in the display apparatus, and the recently displayed external source content.

19. A content displaying method of a display apparatus, the method comprising:
displaying, by the display apparatus, a broadcast content;
receiving, by the display apparatus, a user input for changing a screen of the display while the broadcast content is being displayed;
receiving, by the display apparatus in response to the user input, a multimedia content from an external source based on a pre-stored list, the pre-stored list comprising information on a first predetermined number of broadcast contents including the broadcast content and information on a second predetermined number of multimedia contents including the multimedia content;
processing, by the display apparatus, the multimedia content;
displaying, by the display apparatus, the processed multimedia content by reproducing the processed multimedia content from a recently played end time of the processed multimedia content;
wherein based on a user input for adding a new broadcast content to the pre-stored list, updating the pre-stored list by adding information on the new broadcast content to the pre-stored list and deleting information on one of the broadcast contents included in the pre-stored list,
wherein based on a user input for adding a new multimedia content to the pre-stored list, updating the pre-stored list by adding information on the new multimedia content to the pre-stored list and deleting information on one of the multimedia contents included in the pre-stored list,
wherein the updated pre-stored list comprises information on the first predetermined number of broadcast contents and information on the second predetermined number of multimedia contents, and
wherein the user input is input through a button or a touch input device.

20. The content displaying method of claim 19, wherein the pre-stored list is displayed in a thumbnail form.

21. The content displaying method of claim 19, wherein:
the broadcast contents or the multimedia contents are provided, in the order of the pre-stored list, via a browser; and
the browser comprises at least one of a video browser, a music browser, and a photo browser.

22. The content displaying method of claim 19, wherein the multimedia content is provided together with contents of a same type as the at least one multimedia content through a browser corresponding to at least one content type.

23. The content displaying method of claim 19, wherein the multimedia contents are provided in a thumbnail form.

24. The content displaying method of claim 19, wherein:
   the pre-stored list comprises the information on the first predetermined number of broadcast contents; and
   the multimedia content comprises at least one of a stored multimedia content stored in the display apparatus and a recently viewed external source content.

25. The content displaying method of claim 19, wherein the pre-stored list is a preference list mainly viewed by a user.

26. The content displaying method of claim 19, wherein the pre-stored list comprises information relating to a recent play end time of at least one of recently viewed broadcast channel, stored multimedia content stored in the display apparatus, and recently viewed external source content.

* * * * *